No. 855,996. PATENTED JUNE 4, 1907.
L. D. STAMPS.
SPARK PRODUCING MECHANISM FOR EXPLOSIVE ENGINES.
APPLICATION FILED MAR. 6, 1906.

2 SHEETS—SHEET 1.

WITNESSES:
Edw. Thorpe,
W. Harrison.

INVENTOR
Lorenzo D. Stamps
BY 
ATTORNEYS

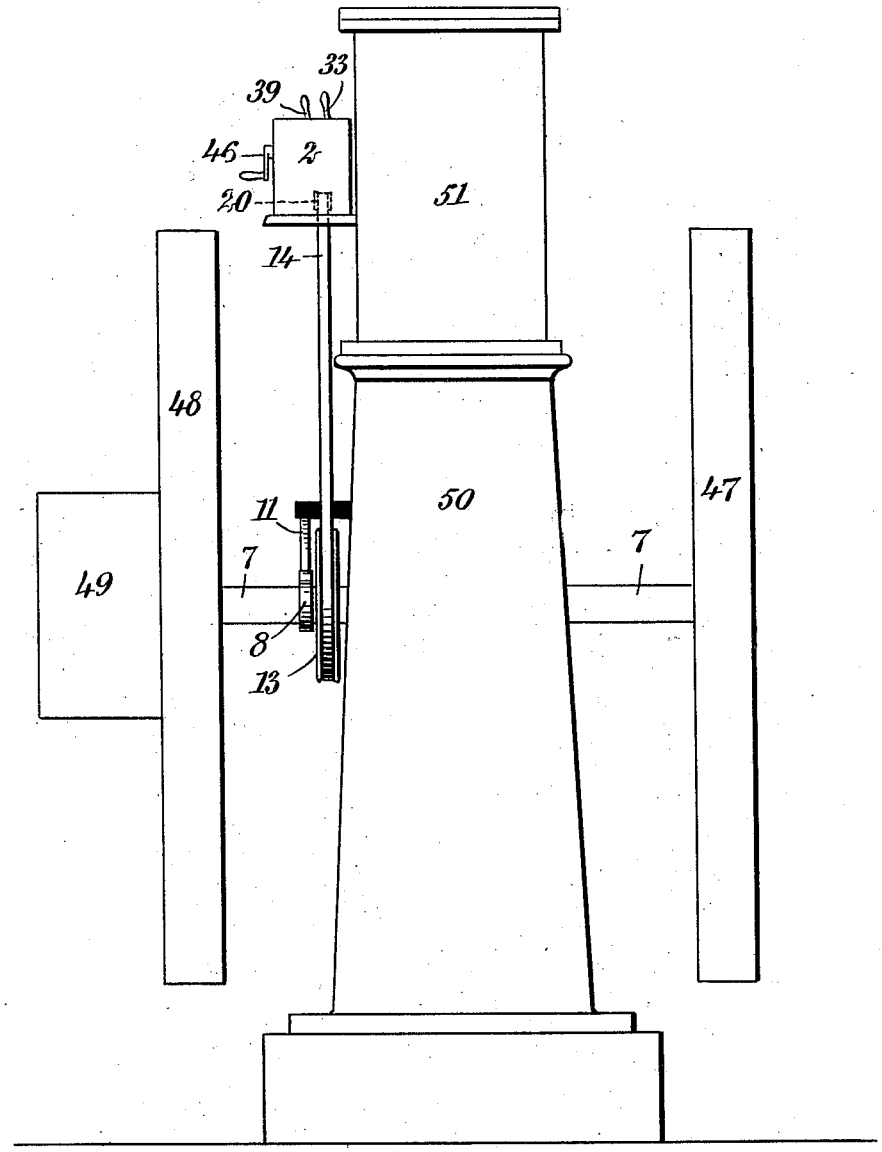

UNITED STATES PATENT OFFICE.

LORENZO DAN STAMPS, OF ANAHUAC, TEXAS, ASSIGNOR TO HIMSELF AND JOHN W. HAMILTON, OF ANAHUAC, TEXAS.

SPARK-PRODUCING MECHANISM FOR EXPLOSIVE-ENGINES.

No. 855,996.　　　Specification of Letters Patent.　　　Patented June 4, 1907.

Application filed March 6, 1906. Serial No. 304,498.

*To all whom it may concern:*

Be it known that I, LORENZO DAN STAMPS, a citizen of the United States, and a resident of Anahuac, in the county of Chambers and State of Texas, have invented a new and Improved Spark-Producing Mechanism for Explosive-Engines, of which the following is a full, clear, and exact description.

My invention relates to mechanism used in connection with explosive engines, and more particularly to mechanism used for producing sparks in starting the engine before the latter acquires sufficient speed to produce the normal spark employed in operation.

Reference is to be had to the accompanying drawings forming a part of this specification, in which similar characters of reference indicate corresponding parts in all the figures.

Figure 1:
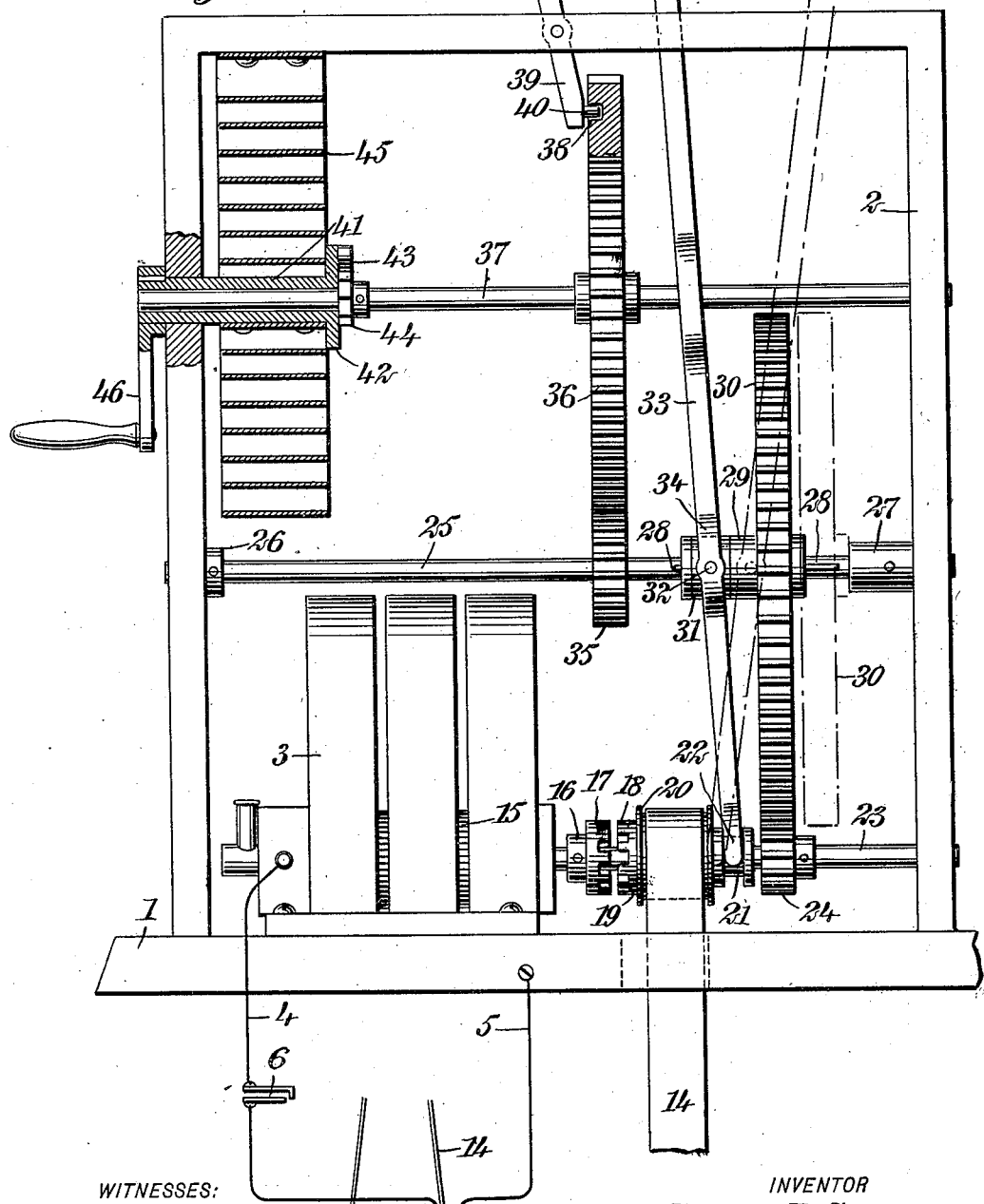
Figure 1:
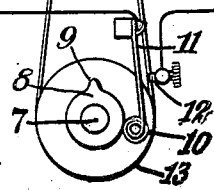

Figure 1 is a side elevation partly diagrammatic, of a sparking device employing my invention; Fig. 2 is likewise a side elevation, but upon a reduced scale, showing the sparking device as connected with an engine.

Mounted upon a base 1 is a framework 2, and supported by the base is an alternating dynamo 3 of the so-called magneto-type. Conductors 4, 5 are connected with this dynamo and with a spark plug 6. This spark plug being old, is shown diagrammatically and is supposed to be located within the cylinder where the explosion takes place. A shaft 7 having a positive movement conferred upon it by the engine is provided with a cam 8 having a lobe 9, the latter engaging a roller 10 carried by a contact spring 11. This spring contacts with a screw 12.

Mounted upon the shaft 7 is a pulley 13, and upon this pulley runs a belt 14. The armature of the dynamo 3 is shown at 15. A clutch member 16 is provided with teeth 17 which mesh with teeth 18 in another clutch member 19. The clutch member 19 is integrally connected with a pulley 20 and with a clutch sleeve 21. A fork 22 enters the clutch sleeve 21 and is used for moving both the pulley 20 and the clutch member 18. The clutch member 19, the pulley 20 and the sleeve 21 are mounted loosely upon a revoluble shaft 23. Secured rigidly upon this shaft is a pinion 24. The belt 14 connects the pulleys 13 and 20 together as indicated in Fig. 2. For convenience, the lower end of the belt 14 is shown diagrammatically at the lower left hand corner of the figure, instead of immediately below the pulley 20. A shaft 25 is revolubly mounted in bearings 26, 27, and is provided with a spline 28. A hub 29 fits loosely over the shaft 25 and the spline 28. Rigidly connected with this hub is a gear wheel 30 which meshes with the pinion 24. By this arrangement the gear wheel 30 is splined upon the shaft 25 and is free to move longitudinally of the same within certain limits, as will be understood from the figure. A collar 31 is used for sliding the hub 29 longitudinally, and connected with this collar 31 by means of the swivel 32 is a lever 33 which is bifurcated at 34 for this purpose.

Mounted rigidly upon the shaft 25 is a pinion 35 which meshes with a gear wheel 36, the latter being rigidly mounted upon a revoluble shaft 37. The gear wheel 36 is provided with an aperture 38 into which fits a boss 40 carried by a hand lever 39. The latter is pivoted upon the framework 2. Loosely encircling the shaft 37 is a sleeve 41 provided at one of its ends with an integral disk 42 carrying a pawl 43 which engages a ratchet wheel 44, the latter being mounted rigidly upon the shaft 37. A spiral spring 45 is connected at one of its ends to the sleeve 41 and at its other end to the framework 2. A handle 46 is keyed rigidly upon the sleeve 41 and is used for winding the spring 45. The pawl 43 prevents backward rotation of the shaft 37. By turning the hand lever 39 the boss 40 may be inserted within or withdrawn from the aperture 38 and thus caused to release or lock the gear 36, as desired. By moving the lever 33 to the right, according to the view shown, the gear 30 is disengaged from the pinion 24, the clutch members 16 and 19 meanwhile being brought into engagement. By turning the lever 33 in the opposite direction, however, the clutch members are disengaged and the gear 30 is brought into mesh with the pinion 24 as shown.

The usual pulleys 47, 48 and 49 are mounted upon the shaft 7. The body of the engine is shown at 50 and the cylinder at 51.

The operation of my device is as follows:—
To wind the spring 45 the lever 33 is brought into the position shown in the figure. The handle 46 is turned and the lever 39 moved into the position indicated so that the boss 40 passes into the aperture 38. This locks the gear 36 and maintains the same under tension so long as the lever 39 occupies the position indicated. If, now, it be desired to start the device into action, the engine is turned by hand into such position that an explosive charge is ready to be ignited. The motion of the engine being conferred simply by hand is necessarily slow at this juncture and would be insufficient to energize the dynamo 3 to a sufficient degree to cause a spark to take place in the spark plug 6, if the action of the engine were to be relied upon for this purpose. By moving the hand lever 39 in the direction indicated by the arrow so as to release the gear 36 the latter under impulse from the spring 45 turns the pinion 35, the shaft 25 and the gear 30. The latter being now in mesh with the pinion 24 causes the shaft 23 to rotate a cam and turns the armature 15. Since, however, the pulley 20 is loose upon the shaft this pulley does not move, and being geared with the engine has no motion except such as may be conferred thereby. This energizes the dynamo, and the engine being in such position that the lobe 9 forces the contact spring 11 against the screw 12 so as to complete the circuit, a spark is made by the spark plug 6 and this starts up the engine. It will be understood, of course, that the spark can only take place when the explosive charge is under compression, and this only takes place when the lobe 9 engages the roller 10 as above explained. The engine being started up slowly by the explosion, the belt 14 causes the pulley 20 to turn the clutch member 19. When the engine acquires a satisfactory degree of speed the lever 33 is shifted in the direction indicated by the arrow, and this brings the clutch member 19 into engagement with the clutch member 16, so that the shaft 23 and the armature 15 are now driven from the engine and have a speed commensurate with that of the engine.

It will be understood that so long as the hand lever 39 remains in proper position to allow the gear member 36 to turn and the lever 33 remains in such position that the clutch members are disconnected, the sparks made by the spark plug 6 will reoccur at proper intervals, being made entirely by the auxiliary apparatus above described instead of being made automatically by the action of the engine. It is only when the auxiliary apparatus is thrown out of action by a movement of the lever 33 and the clutch members 19 and 16 thus connected that the automatic control of the engine begins. Notwithstanding the fact that the sparks are made by the auxiliary apparatus the timing of the sparks is necessarily correct, for the reason that no sparking is permitted by the cam 8 and the contact members 11, 12, adjacent thereto, except when the cam is in a predetermined position. It necessarily follows that no spark made by the auxiliary apparatus can cause a premature explosion of the explosive mixture.

It will be noted that when the spring 45 is being wound by the handle 46 the gear 30 (see dotted lines in the figure) is in its extreme position to the right, and consequently is out of mesh with the pinion 24. This prevents the armature 15 from retarding the revolution of the shaft 37 in winding, and also prevents unnecessary expenditure of energy in generation of currents by the dynamo while the spring is being wound.

Having thus described my invention, I claim as new and desire to secure by Letters Patent:—

1. The combination of a dynamo provided with an armature, a sparking circuit connected with said dynamo and with an engine, a revoluble member also connected with said engine for turning said armature of said dynamo, clutch mechanism controllable at will for disconnecting said armature from said revoluble member, auxiliary means for turning said armature, gearing connecting said auxiliary means with said armature, and means controllable at will for disconnecting said gearing.

2. The combination of a dynamo provided with a revoluble armature and adapted to generate alternating currents, a circuit connected with said dynamo and associated with an engine for the purpose of utilizing said alternating currents in producing sparks, a pulley or the like for enabling said armature to be turned by power from the engine to be driven, clutch mechanism for connecting said armature to said pulley and for disconnecting the same therefrom, auxiliary motor mechanism for turning said armature while temporarily disconnected, and means controllable at will for connecting said auxiliary motor mechanism with said armature, and for disconnecting the same therefrom.

In testimony whereof I have signed my name to this specification in the presence of two subscribing witnesses.

LORENZO DAN STAMPS.

Witnesses:
F. M. HAMILTON,
BURT H. COLLINS.